United States Patent [19]

Etoh et al.

[11] 4,218,428

[45] Aug. 19, 1980

[54] PROCESS FOR REMOVING CHLORINE IONS FROM THE WET FLUE-GAS PROCESSING SYSTEM

[75] Inventors: Yuichi Etoh; Akira Kitayama, both of Ichihara; Sadami Kobayashi, Sodegaura; Shigeyoshi Okazaki, Ichihara, all of Japan

[73] Assignee: Idemitsu Kosan Company Limited, Tokyo, Japan

[21] Appl. No.: 8,405

[22] Filed: Feb. 1, 1979

Related U.S. Application Data

[63] Continuation of Ser. No. 848,983, Nov. 7, 1977, abandoned.

[30] Foreign Application Priority Data

Nov. 15, 1976 [JP] Japan .................................. 51-136374

[51] Int. Cl.$^2$ ...................... C01B 17/06; C01B 13/14
[52] U.S. Cl. .................................. 423/242; 423/481; 423/636

[58] Field of Search .......... 423/242 A, 242 R, 244 A, 423/244 R, 500, 481, 636

[56] References Cited

U.S. PATENT DOCUMENTS

| 3,577,219 | 5/1971 | Shah ...................................... 423/242 |
| 3,650,692 | 3/1972 | Villiers-Fisher ...................... 423/242 |
| 3,758,668 | 9/1973 | Lapple et al. ......................... 423/242 |

FOREIGN PATENT DOCUMENTS

548829 11/1957 United Kingdom ..................... 423/242

*Primary Examiner*—G. O. Peters
*Assistant Examiner*—Gregory A. Heller
*Attorney, Agent, or Firm*—Frishauf, Holtz, Goodman & Woodward

[57] ABSTRACT

A process for removing chlorine ions from wet flue-gas processing system.

According to the process of this invention, the accumulation of the chlorine ions in the processing system is sufficiently prevented, and thus the corrosion of the apparatus is efficiently avoided.

2 Claims, 1 Drawing Figure

PROCESS FOR REMOVING CHLORINE IONS FROM THE WET FLUE-GAS PROCESSING SYSTEM

This is a continuation of application Ser. No. 848,983, filed Nov. 7, 1977, now abandoned.

BACKGROUND OF THE INVENTION

1. Field of the Invention

The present invention relates to a process for removing chlorine ions from wet flue-gas processing system.

2. Description of the prior art

For a wet flue-gas processing system, various procedures have hitherto been employed to completely avoid the formation of waste water in order to prevent pollution. These procedures, however, suffer from the disadvantage in that small amounts of chlorine contained in industrial water, heavy fuel oil, the reagents employed, and the like are concentrated and accumulated in the circulating absorbing solution during the processing. When the chlorine concentration in the circulating absorbing solution reaches 4,000 to 6,000 ppm, stress corrosion cracking, pitching corrosion, etc., of stainless steel, of which an absorbing tower and the like are principally. Therefore, it has long been desired to effectively remove chlorine ions.

In the past, in order to remove the disadvantages due to the accumulation of chlorine ions, a part or the whole of the circulating absorbing solution has been withdrawn from the processing system when the chlorine ion concentration reaches a predetermined level.

This procedure, however, has the disadvantages in that it is difficult to the circulating absorbing solution withdrawn and when abandoned, secondary pollution results. In addition, the economic disadvantages take place in that fresh absorbing solution must be added in an amount corresponding to that of the absorbing solution withdrawn, and in that large amounts of dissolved salts are contained in the absorbing solution withdrawn and therefore lost.

SUMMARY OF THE INVENTION

In accordance with the present invention, we have provided a process for treating a flue-gas by a nearly closed system while maintaining the chlorine ion concentration in the system below a predetermined level.

BRIEF DESCRIPTION OF THE DRAWING

The FIGURE is a flow diagram showing an embodiment of the process of the present invention.

DETAILED DESCRIPTION OF THE INVENTION

Figure 1:
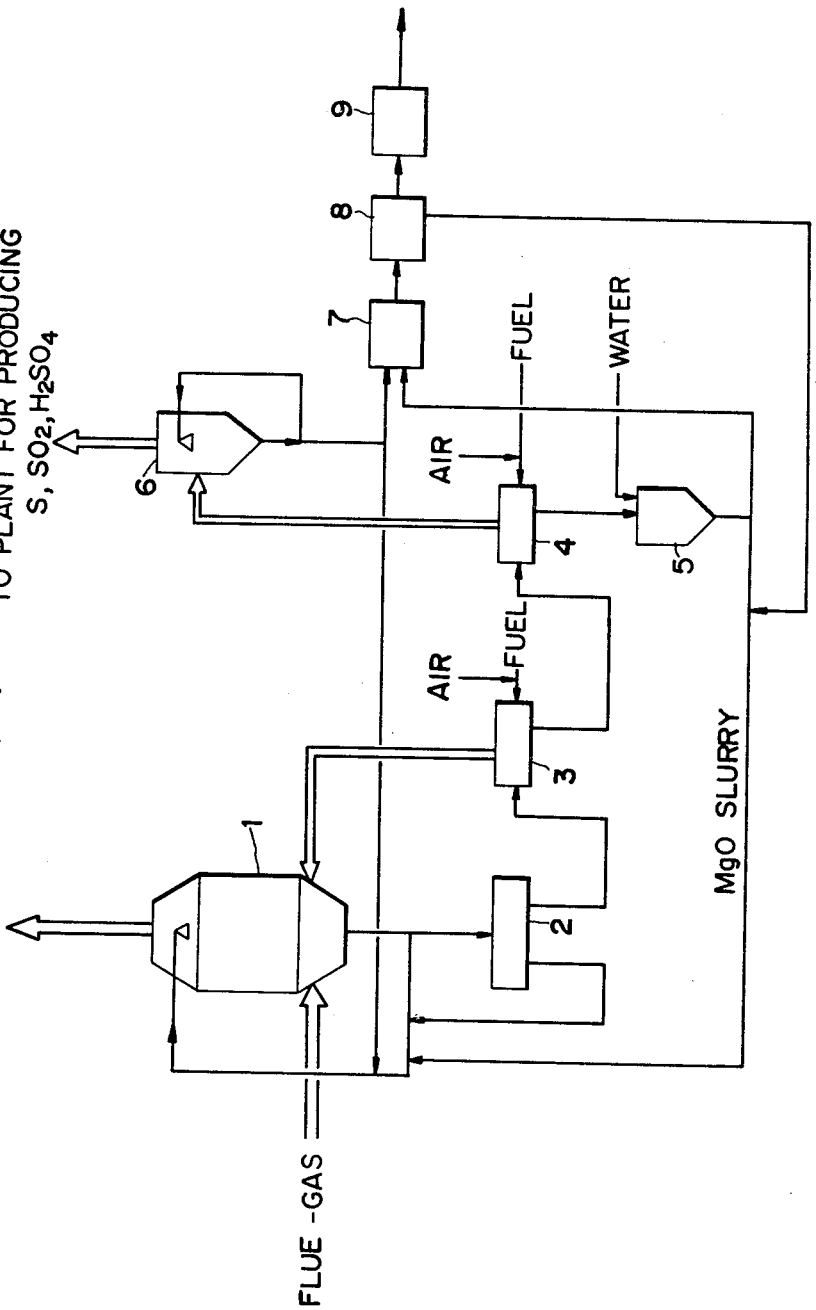

Processing of a flue-gas containing sulfur dioxide by the wet processing system is shown in the FIGURE. Referring to the flow diagram an absorbing solution containing magnesium compounds such as magnesium oxide, magnesium sulfite, magnesium sulfate and the like are brought in contact with the flue-gas in absorption tower 1 to absorb the sulfur dioxide therein. For example, these reactions are as follows:

$$MgO + SO_2 + 3H_2O \rightarrow MgSO_3.3H_2O$$

$$MgSO_3 + SO_2 + H_2O \rightarrow Mg(HSO_3)_2$$

$$Mg(HSO_3)_2 + MgO + 5H_2O \rightarrow 2MgSO_3.3H_2O$$

$$MgO + SO_3 + 7H_2O \rightarrow MgSO_4.7H_2O$$

$$MgSO_3 + \tfrac{1}{2}O_2 + 7H_2O \rightarrow MgSO_4.7H_2O$$

The reaction products and the absorbing agents are separated with centrifugal separator 2 or the like, and the mother liquor is returned to the absorption step for reuse. The solids (wet cake) separated are dried in dryer 3 and then calcined in calcining unit 4 to recover sulfur dioxide and at the same time, to regenerate the magnesium compounds. These magnesium compounds are reused as absorbing agents. The recovered gas containing sulfur dioxide is dedusted in washing tower 6, and it is then used as a feed for production of byproducts such as sulfur or sulfuric acid. The solution withdrawn from the washing tower is returned to the circulating absorption system. In the FIGURE, 5 is a tank, 7 is a neutralizing vessel, 8 is a filter and 9 is an air exposure processing vessel.

In the above flue-gas processing system, the chlorine ions not only circulate through the circulating absorption system together with other components, but a part of the chlorine ions circulate the following course: absorbing system→solid-liquid separating step→drying step→calcining step→washing step→absorbing system.

We have recognized that the solids obtained in the centrifugal separator by the solid-liquid separation (wet cake) usually contain from 5 to 30% by weight water and that the chlorine ions contained in this water are liberated as hydrogen chloride to the gas formed at the dry-calcination step and at least about 90% thereof is finally trapped in the solution at the washing tower. The amount of the chlorine trapped exceeds the amount of chlorine ions formed in all the steps. Thus, it has been found that the accumulation of chlorine ions in the absorption system can be effectively prevented by discharging a part of the solution withdrawn from the above washing tower out of the processing system. The present invention is based upon these findings.

The present invention provides a process for removing chlorine ions from the wet flue-gas processing system comprising the steps of bringing a flue-gas containing sulfur dioxide in contact with a circulating absorbing solution containing a magnesium compound (absorption step), separating solids from a part of the circulating absorbing solution (solid-liquid separation step), drying and calcining the solids to regenerate and reuse the magnesium compound (dry-calcination step) and washing the gas formed at the dry-calcination step with water in a washing tower (washing step), which comprises taking at least a part of the solution withdrawn from the washing tower out of the processing system and controlling the water content of the solids to be fed to the dry-calcination step and the ratio of the solution withdrawn from the washing tower to be taken out of the processing system, whereby the accumulation of the chlorine ions in the processing system is sufficiently prevented.

Since the solution withdrawn from washing tower 6, as described above, contains a large amount of chlorine ions, it is possible to prevent the accumulation of the chlorine ions in the processing system and to maintain its concentration below a certain level by taking a part or the whole of the solution withdrawn from the washing tower out of the processing system.

The ratio of the solution withdrawn from the processing system is controlled taking into account the relation between the desired chlorine ion concentration of the absorbing solution and the water content of the wet cake. For example, where the water content of the wet cake is 15% by weight, if the whole of the solution withdrawn from the washing tower is taken out of the processing system, the chlorine ion concentration in the absorbing system is maintained at about 340 ppm. If the ratio of the solution withdrawn from the processing system is controlled to about 11%, the chlorine ion concentration in the absorption system is as high as 3,000 ppm.

If the chlorine ion concentration in the absorption system is maintained below about 3,000 ppm, it is possible to prevent troubles such as corrosion of the absorbing tower and the like, and thus stable operation is possible for a long period of time.

In accordance with the present invention, if the water content of the wet cake to be fed to the dryer is above 2% by weight, it is possible to maintain the chlorine ion concentration in the absorption system below 3,000 ppm by taking a certain amount of the solution withdrawn from the washing tower out of the processing system. The ratio of the solution withdrawn from the processing system is made inversely proportional to the water content of the solids to be fed to the regeneration processing. That is to say, the ratio of the solution withdrawn from the processing system can be lowered by increasing the water content of the wet cake. Therefore, it is possible to transfer a part of the circulating absorbing solution directly to the dryer without passing it through the centrifugal separator.

The removal of the solution withdrawn from the washing tower of the processing system can be carried out either continuously or discontinuously. Also, by increasing the chlorine ion concentration of the solution withdrawn from the washing tower by temporarily increasing the water content of the wet cake, the amount of the solution to be taken out of the processing system can be decreased.

The solution withdrawn from the washing tower which has been taken out of the processing system generally has a pH of from 1.5 to 3.5, a slurry concentration of from 0 to 3 percent by weight, a total $SO_3$ concentration including the dissolved $SO_2$ gas of from 5 to 8 percent by weight and a COD concentration in supernatant liquid of from 700 to 1500 ppm. By neutralizing this solution with an alkali reagent and, if necessary, adding a flocculating agent, followed by filtration or standing to separate solid and liquid, the solution thus separated is reduced in its solid content of from about 10 to about 20 ppm, its total $SO_3$ concentration of from about 2000 to about 3000 ppm and its COD concentration of from about 25 to about 30 ppm. Further, the total $SO_3$ concentration of the solution can be reduced to from about 20 to about 100 ppm by subjecting the solution to an air exposure processing, and thus it is possible to abandon the solution without causing any secondary pollution. As alkali reagents being employed for neutralization, it is possible to use magnesium oxide slurry of the flue-gas processing as shown in the FIGURE, and the solids separated are again returned to the flue-gas processing step. In carrying out the present invention, temperatures at which the drying and calcination steps are carried out, and operation conditions under which all the steps are effected, can be set as in usual operations. For example, the drying step is usually carried out at from 200° to 250° C. and the calcination step is carried out usually at from 500° to 1,000° C.

What is claimed is:

1. In a process for removing chlorine ions from a wet flue-gas processing system comprising the sequence of steps of bringing a flue-gas containing sulfur dioxide in contact with a circulating absorption solution containing a magnesium compound, separating solids from a part of the circulating absorption solution, drying and calcining the solids to regenerate and reuse the magnesium compound and washing the gas formed during the drying and calcining step with water in a washing tower, the improvement which comprises taking at least a part of the solution withdrawn from the washing tower out of the processing system and controlling the water content of the solids fed to said drying and calcining step and the ratio of the solution withdrawn from the washing tower taken out of the processing system so that the ratio of the solution withdrawn from the washing tower and taken out of the processing system is inversely proportional to the water content of the solids fed to the drying and calcining step whereby accumulation of the chlorine ions in the processing system is sufficiently prevented.

2. The process according to claim 1 wherein the chlorine ion concentration in the processing system is maintained below about 3,000 ppm.

* * * * *